(12) United States Patent
Simon et al.

(10) Patent No.: US 6,409,355 B1
(45) Date of Patent: Jun. 25, 2002

(54) COMBINATION INSTRUMENT

(75) Inventors: Ernst-Ulrich Simon, Oberursel; Hans Kolibius, Babenhausen; Stephan Zech, Eltville, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/242,164
(22) PCT Filed: Aug. 6, 1997
(86) PCT No.: PCT/EP97/04281

§ 371 (c)(1),
(2), (4) Date: Jun. 1, 2000

(87) PCT Pub. No.: WO98/06594

PCT Pub. Date: Feb. 19, 1998

(30) Foreign Application Priority Data

Aug. 10, 1996 (DE) .......................... 196 32 381

(51) Int. Cl.[7] .................................................. G09G 3/00
(52) U.S. Cl. ............................ 362/23; 362/29; 362/30; 362/489; 362/488
(58) Field of Search ........................... 362/29, 30, 489, 362/488

(56) References Cited

U.S. PATENT DOCUMENTS

| | | | | |
|---|---|---|---|---|
| 2,782,294 A | * | 2/1957 | Tinich | 362/23 |
| 4,841,155 A | * | 6/1989 | Ushida | 362/84 |
| 4,991,537 A | * | 2/1991 | Muramatsu | 362/23 |
| 5,173,682 A | * | 12/1992 | Murphy et al. | 340/461 |
| 5,198,936 A | * | 3/1993 | Stringfellow | 359/831 |
| 5,406,303 A | * | 4/1995 | Salmon et al. | 362/26 |
| 5,523,922 A | * | 6/1996 | Kato | 362/23 |
| 5,678,912 A | * | 10/1997 | Ayres | 362/23 |
| 5,741,058 A | * | 4/1998 | Suzuki et al. | 362/27 |
| 5,839,810 A | * | 11/1998 | Hersel et al. | 362/29 |

FOREIGN PATENT DOCUMENTS

| | | |
|---|---|---|
| EP | 0616921 | 9/1994 |
| EP | 0645276 | 3/1995 |
| EP | 0676307 | 10/1995 |

* cited by examiner

*Primary Examiner*—Sandra O'Shea
*Assistant Examiner*—Anabel Ton
(74) *Attorney, Agent, or Firm*—Martin A. Farber (57) ABSTRACT

A combination instrument for a motor vehicle, having a front frame and a display panel and a plurality of display instruments and warning lights which are arranged on a printed circuit board and are provided for displaying information on the display panel. The front frame is produced integrally with light shafts which lead from the warning lights to the display panel. In the region of the warning lights, the display panel is formed by a diaphragm screen which is adhesively bonded to the front frame and is produced as a film. The light shafts simultaneously serve as spacers for the printed circuit board.

29 Claims, 4 Drawing Sheets

COMBINATION INSTRUMENT

FIELD AND BACKGROUND OF THE INVENTION

The invention relates to a combination instrument for a motor vehicle, the instrument having a front frame and a printed circuit board arranged behind the front frame, and having display instruments and warning lights which are provided for displaying information on a display panel, are attached to the printed circuit board and are in electrical contact with the latter. Light shafts are arranged between the warning lights and the display panel, and the front frame has cutouts for the display instruments and for holding a viewing window which is arranged in front of the display panel.

Such combination instruments are used in large numbers in modern motor vehicles and are therefore known. In these instruments a central housing contains the light shafts and ensures that the printed circuit board is at a specific distance from the front frame, the central housing being arranged between the front frame and the printed circuit board. The light shafts prevent the warning lights from emitting light onto adjoining areas of the display panel and are covered by, for example, colored, transparent plastic disks.

A drawback of the known combination instrument is that the central housing represents an additional component to be produced and fitted. As a result, the combination instrument is very cost-intensive. Furthermore, the central housing requires a relatively large amount of space, leading to a considerable structural depth of the combination instrument.

SUMMARY OF THE INVENTION

The invention is based on the problem of designing a combination instrument of the type mentioned at the outset in such a manner that it is as simple as possible to fit and as inexpensive as possible to produce, and has a particularly low structural depth.

According to the invention, this problem is solved by means of a combination instrument for a motor vehicle, the instrument having a front frame and a printed circuit board arranged behind the front frame, and having display instruments and warning lights which are provided for displaying information on a display panel. The display instruments and the warning lights are attached to the printed circuit board and are in electrical contact with the latter. Light shafts are arranged between the warning lights and the display panel, and the front frame has cutouts for the display instruments and for holding a viewing window which is arranged in front of the display panel. In accordance with a feature of the invention the front frame is produced integrally with the light shafts and the display panel is formed by a transparent diaphragm screen which is attached to the front frame and has cutouts for the display area of the display instruments, and the printed circuit board bears against the light shafts and/or against spacers of the front frame.

This configuration means that, in the combination instrument according to the invention, there is no need for a central housing to be fitted separately between the printed circuit board and the front frame, with the result that the instrument has a particularly low structural depth. The display panel, apart from the area of the display instruments, is covered with a diaphragm screen for the warning lights, so that there is no longer any need for individual plastic disks for covering the light shafts. Since the combination instrument according to the invention has particularly few components, it is very simple and therefore inexpensive to produce and fit. An observer is unable to see the front frame in the region of the diaphragm screen and the display instruments, so that the front frame can be configured in many different ways. By way of example, the front frame may be configured in the form of a trough or, in order to increase its stability, may be of honeycomb structure. In the fitted position of the combination instrument, the diaphragm screen covers any edges of the front frame. The display instruments and warning lights which are in electrical contact with the printed circuit board may, for example, be attached directly to the printed circuit board. Spacers for the printed circuit board are required only at those positions of the front frame at which there are no light shafts.

According to an advantageous refinement of the invention, the diaphragm screen can be attached to the front frame particularly easily if it is adhesively bonded to the front frame.

The diaphragm screen is particularly thin and, according to another advantageous refinement of the invention, can be produced inexpensively if it is formed of a film.

According to another advantageous refinement of the invention, the warning lights can be used to graphically display particularly diverse information on the display panel while using the same or similar warning lights if the diaphragm screen is printed with symbols, markings, lettering and/or colored panels which represent information.

The information which can be represented on the display panel by the warning lights can be seen only when the warning lights are actuated if the diaphragm screen has a dark hue and the symbols, markings, lettering and/or colored panels are printed on their side facing toward the front frame and/or on their side facing away from the front frame. The result is a so-called black panel effect.

Incandescent bulbs which emit white light are particularly suitable as warning lights. The use of identical warning lights further reduces the costs of the combination instrument.

It has proven particularly advantageous if light sources which emit colored light are used for the warning lights. Colored LEDs, for example, are suitable for this purpose. If colored light sources are used, there is no need for colored printing of the associated display panels on the diaphragm screen, a fact which is extremely successful in saving costs.

To improve the light efficiency of the warning lights, the light shafts could have a reflective coating on their inner sides. However, according to another advantageous refinement of the invention, such a coating can be avoided if the front frame is made from a light-reflecting material.

It is highly advantageous to use, for example white, plastic as the material for the front frame.

According to another advantageous refinement of the invention, the front frame can be produced particularly inexpensively from plastic, using the injection molding process, if it is made from polypropylene.

The adhesive bond between the front frame, which is made from plastic, and the diaphragm screen is particularly reliable, according to another advantageous refinement of the invention, if the front frame is provided, at least in the region of the diaphragm screen, with a layer of paint. In this case, this layer of paint serves as an adhesion promoter between the adhesive and the plastic of the front frame.

According to another advantageous refinement of the invention, the layer of paint increases the contrast of the display panel if it is colored, e.g. black.

According to another advantageous refinement of the invention, a slight inaccuracy of alignment of the diaphragm screen on the front frame does not lead to overlapping of the cutouts for the display instruments through the diaphragm screen if the cutouts for the display instruments in the front frame and the diaphragm screen are delimited by a diaphragm-screen ring.

The diaphragm-screen ring could, for example, be formed integrally with the diaphragm screen and engage around the cutouts in the front frame. This design of the diaphragm-screen ring does facilitate fitting the diaphragm screen on the front frame and also increases the outlay on producing the diaphragm screen. The diaphragm-screen ring increases the manufacturing outlay on the combination instrument according to the invention only to an insignificant extent if the diaphragm-screen ring is produced integrally with the front frame.

According to another advantageous refinement of the invention, the diaphragm-screen ring can be fitted particularly easily to the front frame by clipping the ring into the front frame.

According to another advantageous refinement of the invention, the diaphragm-screen ring additionally increases the stability of the front frame if it is adhesively bonded into the front frame.

According to an advantageous refinement of the invention, the diaphragm-screen ring is automatically centered in the cutout of the front frame during assembly if it is made from a hot-formable or cold-formable material, and is secured in the front frame by plastic deformation.

Inaccuracies in the cutouts in the front frame and the diaphragm screen are invisible to an observer of the display panel if, according to another advantageous refinement of the invention, the diaphragm-screen ring has an encircling edge which engages over that area of the diaphragm screen which adjoins the cutouts. This makes it possible to make the cutouts in the diaphragm screen larger than in the front frame, so that precise alignment of the diaphragm screen with respect to the front frame is no longer required.

According to another advantageous refinement of the invention, the display instruments are visually emphasized if the diaphragm-screen ring is made from metal.

The diaphragm-screen ring has a low weight and is particularly inexpensive if, according to another advantageous refinement of the invention, the ring is made from plastic and has a metal-coated or painted surface. However, the ring may also, in a particularly simple variant, be made solely from plastic.

It is of considerable economic benefit if the diaphragm-screen rings of the individual display instruments are designed as a unit, for example wherein the rings are connected via webs.

The display instruments in the combination instrument according to the invention could, for example, be illuminated from the side of the observer. However, incident illumination of this nature often leads to undesirable reflections. According to an advantageous refinement of the invention, the display instruments of the combination instrument can be illuminated without risk of reflections if an optical conductor plate, which is provided with light sources or adjoins light guides, is arranged behind a transilluminatable dial which is fitted in the front frame.

The combination instrument according to the invention allows a wide variety of possible optical configurations if the wall of the front frame has a variable wall thickness. This configuration of the front frame allows, by way of example, individual display instruments to be set back or emphasized.

It is often necessary to display additional information in the combination instrument. According to another advantageous refinement of the invention, this is achieved, in a simple manner, by the fact that the dial and/or the front frame has a cutout for a flat screen, e.g. an LCD display. Such a flat screen allows numerous warning indications to be displayed in text form.

The printed circuit board could, for example, be screwed or clipped to the front frame. However, since the combination instrument often has a rear wall, according to another advantageous refinement of the invention a separate attachment of the printed circuit board to the front frame can be avoided if the printed circuit board and the dial are clamped between the front frame and the rear wall.

For the purposes of assembly without using tools, the combination instrument according to the invention can be fitted together readily if the front frame is connected to the rear wall by means of a clip-in connection. This allows substantially automated assembly of the combination instrument.

BRIEF DESCRIPTION OF THE DRAWINGS

The invention allows numerous embodiments. To further explain its fundamental principle, a plurality of these embodiments are described below and are illustrated in the drawing, in which.

DETAILED DESCRIPTION OF THE PREFERRED EMBODIMENTS

Figure 1:
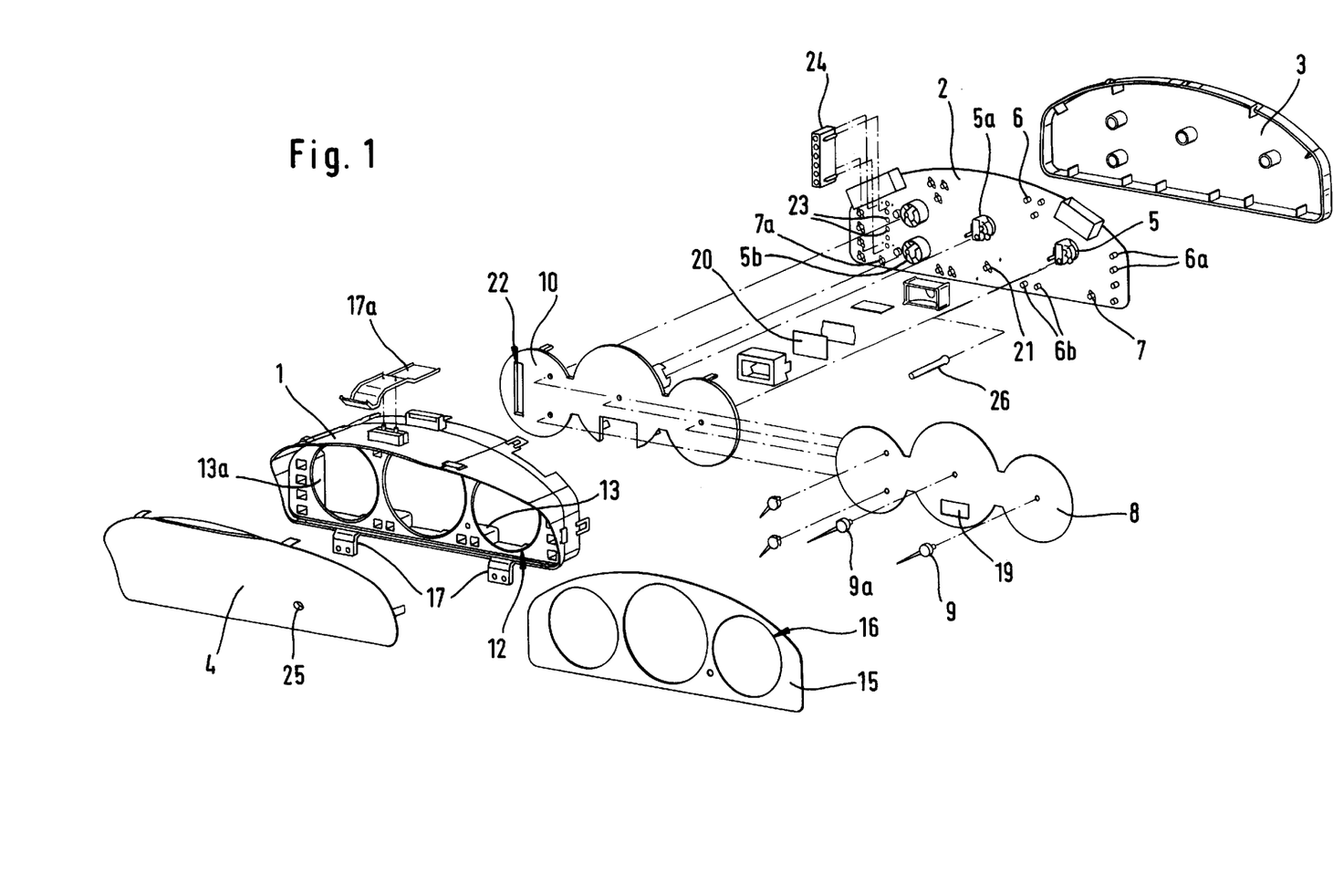
FIG. 1 shows an exploded view of a combination instrument according to the invention.

FIG. 1 shows a combination instrument according to the invention, having a front frame 1, a printed circuit board 2 and a rear wall 3, prior to assembly. A viewing window 4 can be clipped in on the front side of the front frame 1. A plurality of pointer drive systems 5, 5a, 5b, warning lights 6, 6a, 6b and incandescent bulbs 7, 7a are arranged on the printed circuit board 2. The pointer drive systems 5, 5a, 5b serve to drive pointers 9, 9a which are able to pivot over a dial 8 in the fitted position of the combination instrument. The dial 8 is made from a transparent material and is provided for attachment to an optical conductor plate 10 which can be transilluminated by the incandescent bulbs 7. The pointer drive systems 5, 5a, 5b, together with the pointers 9, 9a and the dial 8, in each case form a display instrument 11 which is illustrated in FIG. 2.

Figure 2:
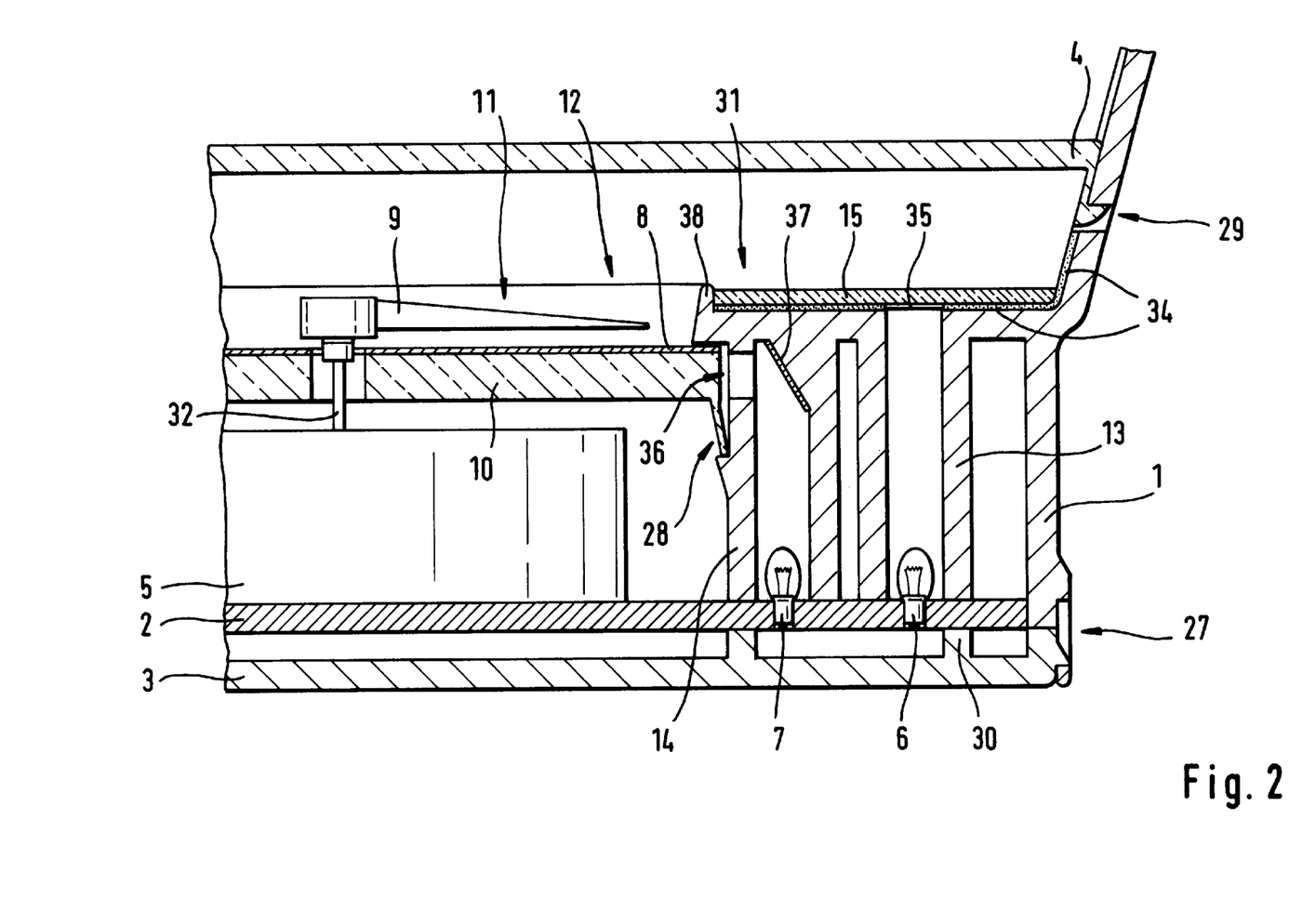
FIG. 2 shows a sectional view through a lateral area of the combination instrument shown in FIG. 1, FIGS. 3–6 show a plurality of exemplary embodiments of a diaphragm-screen ring.

The front frame 1 has a plurality of cutouts 12 for the display instruments 11 and is produced integrally with light shafts 13, 13a for the warning lights 6, 6a, 6b and light guides 14, which are illustrated in FIG. 2, for the incandescent bulbs 7, 7a. The front side of the front frame 1 is used to secure a diaphragm screen 15. Like the front frame 1, this diaphragm screen 15 has cutouts 16 for display instruments 11 and, in the fitted position, covers the light shafts 13, 13a of the warning lights 6, 6a, 6b. Furthermore, the front frame 1 has a plurality of holding parts 17, 17a for securing the combination instrument in a dashboard (not shown) of a motor vehicle. The combination instrument is electrically connected to the motor vehicle by means of plug contacts which are arranged on the printed circuit board 2.

The dial 8 and the optical conductor plate 10 each have a cutout 19 for a flat screen 20 which is to be attached to the printed circuit board 2. Such a flat screen 20 is often required for additional indications which are displayed to an observer in text form. The flat screen 20 has its own incandescent bulb 21 for it to be transilluminated. Furthermore, the optical conductor plate 10 has a further cutout 22, through which additional information can be projected onto the dial 8 by a series of light-emitting diodes 23 which are arranged on the printed circuit board 2. Light shafts 24 which are required for this projection are intended to be fitted to the printed circuit board 2. A bore 25 which is made in the front frame 1 and the viewing window 4 serves to guide through an actuator 26 for resetting a trip odometer.

A lateral area of the combination instrument shown in FIG. 1 is illustrated in section, in the assembled position, in FIG. 2. In this case, the rear wall 3, the viewing window 4 and the optical conductor plate 10 are secured in the front frame 1 by means of clip-in connections 27–29. The printed circuit board 2 bears against the light shafts 13 of the front frame 1 and against webs 30 of the rear wall 3 and is thus clamped between the front frame 1 and the rear wall 3. The diaphragm screen 15 and the dial 8 together form a display panel 31.

A pointer shaft 32 of one of the pointer drive systems 5, which are attached to the printed circuit board 2 and are in electrical contact with the latter, penetrates through the optical conductor plate 10 and the dial 8. As a result, the pointer 9 can be pivoted over the dial 8. That side of the front frame 1 which faces toward the viewing window 4 is provided with a layer of black paint 34. The diaphragm screen 15, which is produced as a film, is adhesively bonded to this layer of paint 34. The layer of paint 34 therefore serves as an adhesion promoter between the front frame 1, which is preferably made from polypropylene, and the diaphragm screen 15. The cutout 12 for the display instrument 11 is delimited by a diaphragm-screen ring 38.

In FIG. 2, a single warning light 6, which is intended to represent the warning lights 6, 6a, 6b shown in FIG. 1, is shown in one of the light shafts 13 for the transillumination of the diaphragm screen 15. On its side facing toward the warning light 6, the diaphragm screen 15 is printed as shown at 35 in color with symbols or markings and is otherwise of dark hue in order to produce a black panel effect. Therefore, when the warning light 6 is switched off, the diaphragm screen 15 appears uniformly dark. Only when the warning light 6 is switched on can the symbols or markings be seen and distinguished in terms of color from their surroundings. The incandescent bulb 7 serves to input light into the optical conductor plate 10 and therefore to transilluminate the dial 8. The light guide 14 of the incandescent bulb 7 has an opening 36 in the region of the optical conductor plate 10 and a reflective coating 37 opposite this opening, by means of which coating the light from the incandescent bulb 7 is reflected laterally onto the optical conductor plate 10.

Figure 3:
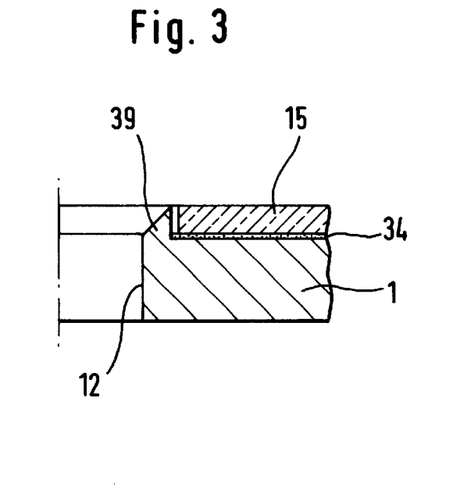
Figure 4:
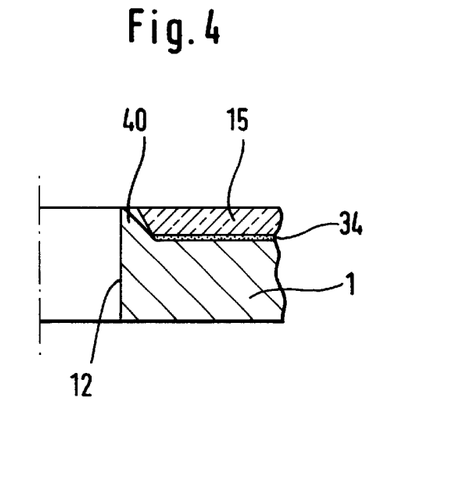

FIGS. 3 and 4 each show a diaphragm-screen ring 39, 40 which is produced integrally with the front frame 1. In FIG. 3, the diaphragm-screen ring 39 is beveled toward the cutout 12. This visually emphasizes the display instrument 11 shown in FIG. 2. The diaphragm-screen ring 40 from FIG. 4 is beveled in the opposite direction to the diaphragm-screen ring 39 from FIG. 3. This facilitates fitting the diaphragm screen 15 on the front frame 1.

Figure 5:
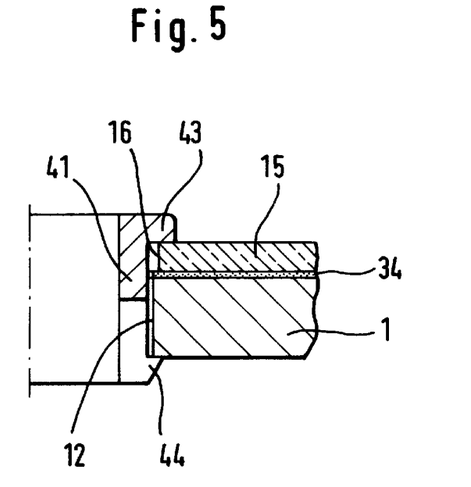

FIG. 5 shows a diaphragm-screen ring 41 which is fitted into the cutout 12 after the diaphragm screen 15 has been mounted on the front frame 1. At its end facing toward the diaphragm screen 15, the diaphragmscreen ring 41 has an encircling edge 43 which engages around that area of the diaphragm screen 15 which adjoins the cutout 12. As a result, inaccuracies in the cutouts 12, 16 in the front frame 1 and the diaphragm screen 15 are covered by the edge 43. At its end facing away from the edge 43, the diaphragm-screen ring 41 has a resilient, hook-shaped latching member 44 which engages behind the front frame 1. As a result, the diaphragm-screen ring 41 is held in the cutouts 12, 16 in a form-fitting manner.

Figure 6:
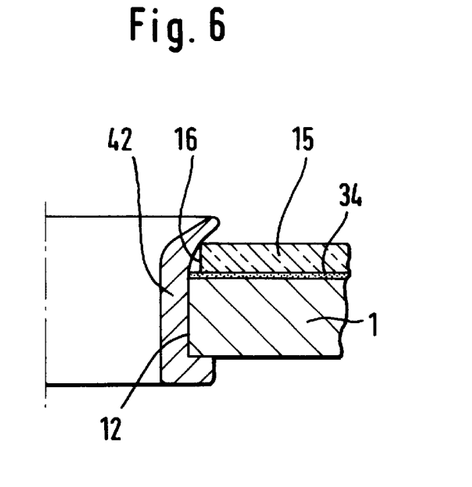

FIG. 6 shows a diaphragm-screen ring 42 which is made from a hot-formable or cold-formable material which has been plastically deformed after insertion into the cutouts 12, 16. During the plastic deformation, the diaphragm-screen ring 42 is centered in the cutouts 12, 16.

Figure 7:
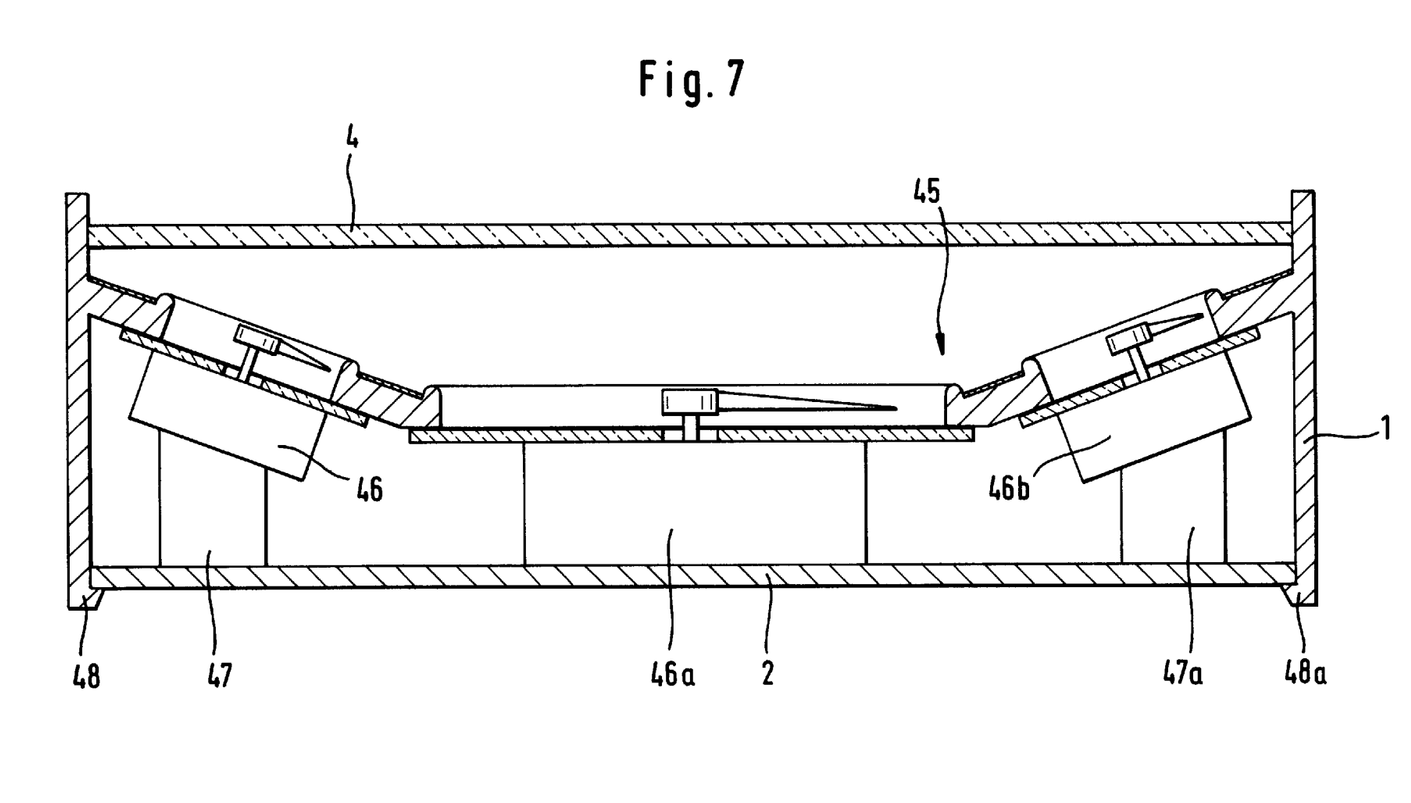
FIG. 7 shows a diagrammatic illustration of a further embodiment of the combination instrument, in longitudinal section.

FIG. 7 shows a sectional view of a combination instrument with a trough-shaped display panel 45. In this case, a plurality of pointer drive systems 46, 46a, 46b are attached to holding parts 47, 47a which are supported against the printed circuit board 2. The printed circuit board 2 is held in the front frame 1 by means of latching members 48, 48a. In order to simplify the drawing, the light shafts 13 and the light guides 14 from FIG. 2 are not shown.

We claim:
1. A combination instrument for a motor vehicle, comprising:
    a front frame, and a printed circuit board arranged behind the front frame;
    a display panel with display instruments and light sources including warning lights for displaying information on the display panel, the display instruments and the warning lights being attached to the printed circuit board and being in electrical contact with the printed circuit board, the display instruments being larger than the warning lights and extending from the printed circuit board to a location forward of the warning lights, the display instruments being located between the display panel and the present circuit board;
    light shafts arranged between the warning lights and the display panel, the light shafts extending from the warning lights as well as other lights at the printed circuit board past a display instrument of said display instruments to the display panel, the light shafts conducting light from the lights to locations on the display panel to the side of and in front of at least one of the display instruments;
    wherein the front frame has cutouts for display areas of the display instruments;
    the front frame holds a viewing window arranged in front of the display panel;
    the front frame is produced integrally with the light shafts as a single assembly and constituting a single component of the combination instrument;
    the display panel includes a transparent diaphragm screen which is attached to the front frame and has cutouts for the display areas of the display instruments; and
    the printed circuit board contacts ends of the light shafts distant from the display panel and bears against the light shafts and/or against spacers of the front frame.
2. A combination instrument for a motor vehicle, comprising:
    a front frame, and a printed circuit board arranged behind the front frame;
    a display panel with display instruments and light sources including warning lights for displaying information on the display panel, the display instruments and the warning lights being attached to the printed circuit board and being in electrical contact with the printed circuit board;

light shafts arranged between the warning lights and the display panel, the light shafts extending past a display instrument of said display instruments from the printed circuit board to the display panel;

wherein the front frame has cutouts for display areas of the display instruments;

the front frame holds a viewing window arranged in front of the display panel;

the front frame is produced integrally with the light shafts as a single assembly and constituting a single component of the combination instrument;

the display panel includes a transparent diaphragm screen which is attached to the front frame and has cutouts for the display areas of the display instruments;

the printed circuit board contacts ends of the light shafts distant from the display panel and bears against the light shafts and/or against spacers of the front frame; and the diaphragm screen is adhesively bonded to the front frame.

3. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel, the light shafts extending past a display instrument of said display instruments from the printed circuit board to the display panel;

wherein the front frame has cutouts for display areas of the display instruments;

the front frame holds a viewing window arranged in front of the display panel;

the front frame is produced integrally with the light shafts as a single assembly and constituting a single component of the combination instrument;

the display panel includes a transparent diaphragm screen which is attached to the front frame and has cutouts for the display areas of the display instruments;

the printed circuit board contacts ends of the light shafts distant from the display panel and bears against the light shafts and/or against spacers of the front frame; and the diaphragm screen comprises a film.

4. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel, the light shafts extending past a display instrument of said display instruments from the printed circuit board to the display panel;

wherein the front frame has cutouts for display areas of the display instruments;

the front frame holds a viewing window arranged in front of the display panel;

the front frame is produced integrally with the light shafts as a single assembly and constituting a single component of the combination instrument;

the display panel includes a transparent diaphragm screen which is attached to the front frame and has cutouts for the display areas of the display instruments;

the printed circuit board contacts ends of the light shafts distant from the display panel and bears against the light shafts and/or against spacers of the front frame; and the diaphragm is printed with symbols, markings, lettering and/or colored areas which represent information.

5. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel, the light shafts extending past a display instrument of said display instruments from the printed circuit board to the display panel;

wherein the front frame has cutouts for display areas of the display instruments;

the front frame holds a viewing window arranged in front of the display panel;

the front frame is produced integrally with the light shafts as a single assembly and constituting a single component of the combination instrument;

the display panel includes a transparent diaphragm screen which is attached to the front frame and has cutouts for the display areas of the display instruments;

the printed circuit board contacts ends of the light shafts distant from the display panel and bears against the light shafts and/or against spacers of the front frame; and the diaphragm screen has a dark hue and the symbols, markings, lettering and/or colored panels are printed on their side facing toward the front frame and/or on their side facing away from the front frame.

6. The combination instrument as claimed in claim 1, wherein the warning lights are formed by light sources.

7. The combination instrument as claimed in claim 6, wherein the light sources comprises LEDs, which emit colored light.

8. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel, the light shafts extending past a display instrument of said display instruments from the printed circuit board to the display panel;

wherein the front frame has cutouts for display areas of the display instruments;

the front frame holds a viewing window arranged in front of the display panel;

the front frame is produced integrally with the light shafts as a single assembly and constituting a single component of the combination instrument;

the display panel includes a transparent diaphragm screen which is attached to the front frame and has cutouts for the display areas of the display instruments;

the printed circuit board contacts ends of the light shafts distant from the display panel and bears against the light shafts and/or against spacers of the front frame; and the front frame comprises a light-reflecting material.

9. The combination instrument as claimed in claim 1, wherein the front frame comprises plastic.

10. The combination instrument as claimed in claim 9, wherein the plastic is polypropylene, the plastic being white.

11. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel, the light shafts extending past a display instrument of said display instruments from the printed circuit board to the display panel;

wherein the front frame has cutouts for display areas of the display instruments;

the front frame holds a viewing window arranged in front of the display panel;

the front frame is produced integrally with the light shafts as a single assembly and constituting a single component of the combination instrument;

the display panel includes a transparent diaphragm screen which is attached to the front frame and has cutouts for the display areas of the display instruments;

the printed circuit board contacts ends of the light shafts distant from the display panel and bears against the light shafts and/or against spacers of the front frame; and the front frame is provided, at least in a region of the diaphragm screen, with a layer of paint.

12. The combination instrument as claimed in claim 11, wherein the layer of paint is colored black.

13. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board, the display instruments being larger than the warning lights and extending from the printed circuit board to a location forward of the warning lights, the display instruments being located between the display panel and the printed circuit board;

light shafts arranged between the warning lights and the display panel, the light shafts extending from the warning lights as well as other lights at the printed circuit board past a display instrument of said display instruments to the display panel, the light shafts conducting light from the lights to locations on the display panel to the side of and in front of at least one of the display instruments;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame; and the cutouts for the display instruments in the front frame and the diaphragm screen are delimited by diaphragm-screen rings.

14. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame;

the cutouts for the display instruments in the front frame and the diaphragm screen are delimited by diaphragm-screen rings; and the diaphragm-screen rings are produced integrally with the front frame.

15. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame;

the cutouts for the display instruments in the front frame and the diaphragm screen are delimited by diaphragm-screen rings; and the diaphragm-screen rings are clipped into the front frame.

16. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame;

the cutouts for the display instruments in the front frame and the diaphragm screen are delimited by diaphragm-screen rings; and the diaphragm rings are adhesively bonded into the front frame.

17. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame;

the cutouts for the display instruments in the front frame and the diaphragm screen are delimited by diaphragm-screen rings; and the diaphragm-screen rings comprise a hot-formable or cold-formable material and is secured in the front frame by plastic deformation.

18. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame;

the cutouts for the display instruments in the front frame and the diaphragm screen are delimited by diaphragm-screen rings; and each of the diaphragm-screen rings has an encircling edge which engages over an area of the diaphragm screen which adjoins a corresponding one of the cutouts.

19. A combination instrument for a motor vehicle, comprising:

a front frame, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame;

the cutouts for the display instruments in the front frame and the diaphragm screen are delimited by diaphragm-screen rings; and the diaphragm-screen rings comprise metal.

20. A combination instrument for a motor vehicle, comprising:

a front frame, and a printed circuit board arranged behind the front frame;

a display panel with display instruments and light sources
including warning lights for displaying information on
the display panel, the display instruments and the
warning lights being attached to the printed circuit
board and being in electrical contact with the printed
circuit board;

light shafts arranged between the warning lights and the
display panel;

wherein the front frame has cutouts for display areas of
the display instruments;

the front frame holds a viewing window arranged in front
of the display panel;

the front frame is produced integrally with the light shafts;

the display panel includes a transparent diaphragm screen
which is attached to the front frame and has cutouts for
the display areas of the display instruments;

the printed circuit board bears against the light shafts
and/or against spacers of the front frame;

the cutouts for the display instruments in the front frame
and the diaphragm screen are delimited by diaphragm-
screen rings; and the diaphragm-screen rings comprise plastic.

21. A combination instrument for a motor vehicle, comprising:

a front frame, and a printed circuit board arranged behind
the front frame;

a display panel with display instruments and light sources
including warning lights for displaying information on
the display panel, the display instruments and the
warning lights being attached to the printed circuit
board and being in electrical contact with the printed
circuit board;

light shafts arranged between the warning lights and the
display panel;

wherein the front frame has cutouts for display areas of
the display instruments;

the front frame holds a viewing window arranged in front
of the display panel;

the front frame is produced integrally with the light shafts;

the display panel includes a transparent diaphragm screen
which is attached to the front frame and has cutouts for
the display areas of the display instruments;

the printed circuit board bears against the light shafts
and/or against spacers of the front frame;

the cutouts for the display instruments in the front frame
and the diaphragm screen are delimited by diaphragm-
screen rings; and an individual one of the diaphragm-screen rings is made
from plastic and has a metal-coated or painted surface.

22. A combination instrument for a motor vehicle, comprising:

a front frame, and a printed circuit board arranged behind
the front frame;

a display panel with display instruments and light sources
including warning lights for displaying information on
the display panel, the display instruments and the
warning lights being attached to the printed circuit
board and being in electrical contact with the printed
circuit board;

light shafts arranged between the warning lights and the
display panel;

wherein the front frame has cutouts for display areas of
the display instruments;

the front frame holds a viewing window arranged in front
of the display panel;

the front frame is produced integrally with the light shafts;

the display panel includes a transparent diaphragm screen
which is attached to the front frame and has cutouts for
the display areas of the display instruments;

the printed circuit board bears against the light shafts
and/or against spacers of the front frame;

the cutouts for the display instruments in the front frame
and the diaphragm screen are delimited by diaphragm-
screen rings; and the diaphragm-screen rings which delimit the cutouts are
constructed as an integral unit.

23. The combination instrument as claimed in claim 1, further comprising:

an optical conductor plate and a light guide for coupling
light of the light sources to the optical conductor plate,
and wherein the diaphragm screen includes a transilluminatable dial;

wherein the front frame supports the optical conductor
plate and the dial spaced apart from the light sources,
the light guides being interposed between the light
sources and the dial for transference of light from the
light sources to the dial.

24. A combination instrument for a motor vehicle, comprising:

a front frame, and a printed circuit board arranged behind
the front frame;

a display panel with display instruments and light sources
including warning lights for displaying information on
the display panel, the display instruments and the
warning lights being attached to the printed circuit
board and being in electrical contact with the printed
circuit board;

light shafts arranged between the warning lights and the
display panel, the light shafts extending past a display
instrument of said display instruments from the printed
circuit board to the display panel;

wherein the front frame has cutouts for display areas of
the display instruments;

the front frame holds a viewing window arranged in front
of the display panel;

the front frame is produced integrally with the light shafts
as a single assembly and constituting a single component of the combination instrument;

the display panel includes a transparent diaphragm screen
which is attached to the front frame and has cutouts for
the display areas of the display instruments;

the printed circuit board contacts ends of the light shafts
distant from the display panel and bears against the
light shafts and/or against spacers of the front frame;
and the wall of the front frame has a variable wall thickness.

25. The combination instrument as claimed in claim 23, further comprising a flat screen and, wherein the dial and/or the front frame has a cutout for receiving the flat screen.

26. A combination instrument for a motor vehicle, comprising:

a front frame, a rear wall, and a printed circuit board
arranged behind the front frame;

a display panel with display instruments and light sources
including warning lights for displaying information on
the display panel, the display instruments and the
warning lights being attached to the printed circuit board and being in electrical contact with the printed circuit board, the display instruments being larger than the warning lights and extending from the printed circuit board to a location forward of the warning lights, the display instruments being located between the display panel and the printed circuit board;

light shafts arranged between the warning lights and the display panel, the light shafts extending from the warning lights as well as other lights at the printed circuit board past a display instrument of said display instruments to the display panel, the light shafts conducting light from the lights to locations on the display panel to the side of and in front of at least one of the display instruments;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame; and the printed circuit board is clamped between the front frame and the rear wall.

27. A combination instrument for a motor vehicle, comprising:

a front frame, a rear wall, and a printed circuit board arranged behind the front frame;

a display panel with display instruments and light sources including warning lights for displaying information on the display panel, the display instruments and the warning lights being attached to the printed circuit board and being in electrical contact with the printed circuit board;

light shafts arranged between the warning lights and the display panel;

wherein the front frame has cutouts for display areas of the display instruments;

the front frame holds a viewing window arranged in front of the display panel;

the front frame is produced integrally with the light shafts;

the display panel includes a transparent diaphragm screen which is attached to the front frame and has cutouts for the display areas of the display instruments;

the printed circuit board bears against the light shafts and/or against spacers of the front frame;

the printed circuit board is clamped between the front frame and the rear wall; and the front frame is connected to the rear wall by means of a clip-in connection.

28. A combination instrument as claimed in claim 22, wherein the rings are interconnected by webs.

29. A combination instrument as claimed in claim 25, wherein the flat screen is an LCD display.

* * * * *